(12) United States Patent
Schmick, Jr.

(10) Patent No.: US 6,202,315 B1
(45) Date of Patent: Mar. 20, 2001

(54) SURVEYING SPIKE FOR USE ON VERTICAL SURFACES

(75) Inventor: Robert H. Schmick, Jr., Warwick, NY (US)

(73) Assignee: BenchTie L.L.C., Warwick, NY (US)

( * ) Notice: Subject to any disclaimer, the term of this patent is extended or adjusted under 35 U.S.C. 154(b) by 0 days.

(21) Appl. No.: 09/235,603

(22) Filed: Jan. 20, 1999

(51) Int. Cl.[7] .............................. G01C 5/00; G01C 15/00; G01D 21/00

(52) U.S. Cl. .............................. 33/290; 33/1 H; 33/286; 116/209

(58) Field of Search .......................... 33/1 H, 1 G, 286, 33/293, 391, 533, 613, 645, 1 CC, 290; 116/209

(56) References Cited

U.S. PATENT DOCUMENTS

| | | | |
|---|---|---|---|
| D. 234,098 | * 1/1975 | Coumbs | 33/293 |
| 928,477 | * 7/1909 | Sloggett | 33/290 |
| 2,096,638 | * 10/1937 | Higgins | 33/290 |
| 2,762,128 | * 11/1956 | Whelan | 33/290 |
| 2,904,890 | * 9/1959 | Vajda | 33/293 |
| 3,475,101 | * 10/1969 | Jeffery, Sr. | 33/290 |
| 3,781,079 | * 12/1973 | Hug et al. | 359/218 |
| 3,890,717 | * 6/1975 | Haun | 33/413 |
| 5,062,753 | * 11/1991 | Begue | 411/470 |
| 5,247,900 | * 9/1993 | Sobczak | 116/209 |
| 5,568,785 | * 10/1996 | Hazen | 116/209 |
| 5,943,784 | * 8/1999 | Hiramine | 33/293 |
| 5,946,877 | * 9/1999 | Gallinat et al. | 52/543 |
| 6,044,567 | * 4/2000 | Feist | 33/290 |

FOREIGN PATENT DOCUMENTS

| | | | |
|---|---|---|---|
| 908391 | * 8/1972 | (CA) | 116/209 |
| 93/19447 | * 9/1993 | (WO) | 116/209 |

* cited by examiner

Primary Examiner—Diego Gutierrez
Assistant Examiner—Faye Francis
(74) Attorney, Agent, or Firm—Fitzpatrick, Cella, Harper & Scinto

(57) ABSTRACT

A surveying spike is described which includes a single nail portion and an end portion; the end portion is attached to the nail portion and coaxial therewith. The end portion has a body portion, and a reference surface forming portion projecting radially from the body portion and having a reference surface formed thereon parallel to the axis of the end portion. The reference surface has a dimple formed therein. When the surveying spike is driven into a vertical surface, the reference surface may then be horizontal and the dimple may receive a vertical pole; this facilitates surveying using EDM (electronic distance measurement) techniques. The surveying spike may advantageously be manufactured by providing a metal nail portion and a plastic end portion, and inserting the nail into the end portion.

14 Claims, 1 Drawing Sheet

SURVEYING SPIKE FOR USE ON VERTICAL SURFACES

BACKGROUND OF THE INVENTION

This invention relates to a survey marker which may be driven into a vertical surface while providing a horizontal reference surface, thereby facilitating EDM (Electronic Distance Measurement) surveying.

Traditional surveying methods employed survey markers placed in horizontal surfaces so that a transit could be set up over the marker. A plumb bob was normally used to center the surveyor on the mark; a dimple in the marker defined the exact center location. More recently, an optical plumb has been used as well as a mechanical plumb.

In more modern surveying, field measurements are obtained using EDM instruments. A typical EDM instrument emits a light beam which reflects from a distant prism (generally mounted on a prism pole) and then back to the EDM. This arrangement replaces the transit and rod of traditional surveying. In particular, if the dimple of a survey marker is located on a horizontal surface, a prism pole may be placed in the dimple and held vertically. Reflecting the beam from the prism on the prism pole serves to define an exact horizontal and vertical location.

However, presently available survey markers may be used with EDM instruments and prism poles only when the marker is placed in a horizontal surface, since only then is the dimple disposed horizontally. Often a location in a horizontal surface is not permanent; for example, if the marker is driven into the earth at a construction site, the location may be destroyed during construction activities. Fixing the marker in the earth is sometimes difficult because the ground is swampy, or covered with water or snow.

Accordingly, it is preferable in many instances to fix the survey marker to a vertical surface. Furthermore, it is desirable that the survey marker be inexpensive, since several markers are permanently left at the site in a typical surveying job.

U.S. Pat. No. 5,062,753 describes a survey nail which may be driven into a vertical surface. This nail includes two spike shanks and an integral benchmark surface which is horizontal when the nail is driven into the vertical surface. This arrangement has a complicated structure which increases its manufacturing cost. In addition, the patent describes a sighting dimple located on an impact surface of the nail. Such a dimple would be on a vertical surface when the nail is driven into a vertical surface, and thus would not be usable with a prism pole.

SUMMARY OF THE INVENTION

The present invention provides an inexpensive surveying spike which includes a horizontal reference surface when the spike is driven into a vertical surface.

According to the present invention, a surveying spike having a longitudinal axis is provided with a single nail portion and an end portion; the end portion is attached to the nail portion and is coaxial therewith. The end portion has a body portion and a reference surface projecting radially from the body portion. The reference surface is disposed parallel to the axis of the end portion and has a dimple formed therein.

According to another aspect of the invention, the nail portion is formed of a metallic material and the end portion is formed of a plastic material.

According to a further aspect of the invention, a casing is provided for a conventional nail; the nail is inserted along an axis of the casing, thereby forming a surveying spike. The casing has a body portion and a reference surface projecting radially therefrom. Again the reference surface is parallel to the axis of the casing, and has a dimple formed therein. The casing may be formed of a plastic material to minimize cost.

Furthermore, the present invention provides a method of manufacturing a surveying spike. The method includes the steps of providing one metal nail; providing a plastic member having a longitudinal axis and having a body portion and a reference surface projecting radially from the body portion with respect to the axis, the reference surface being disposed parallel to the axis and having a dimple formed therein; and inserting the nail into the plastic member along the longitudinal axis. Additionally, an identification tag is provided having information thereon such as distance, and elevation. The tag has a hole punched therein to receive the nail, so that the tag hangs from the surveying spike and is held in place by the plastic member.

DETAILED DESCRIPTION OF THE PREFERRED EMBODIMENTS

Figure 1:
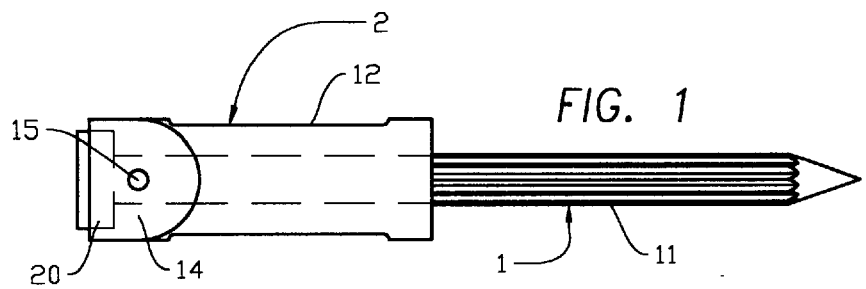
FIG. 1 is a top view of a surveying spike representing an embodiment of the present invention.
Figure 2:
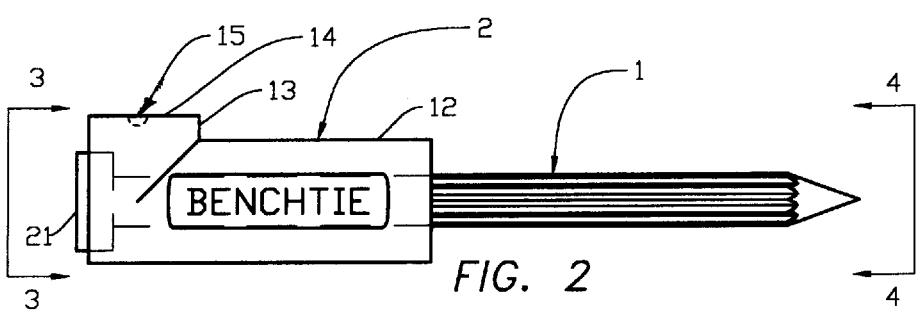
FIG. 2 is a side view of the surveying spike shown in FIG. 1.

FIGS. 1 and 2 are top and side views, respectively, of a surveying spike constructed according to an embodiment of the invention. The spike has a metal nail 1 inserted through a casing 2 formed of high-impact plastic. The nail shank 11 may be splined and protrudes from the casing 2 preferably by a distance of 2 in. or more, so that the nail may be firmly anchored in a vertical surface (for example, a tree or telephone pole). The body 12 of casing 2 has a larger diameter than the nail shank 11, to prevent the nail from being driven completely into the vertical surface. As shown in FIGS. 1 and 2, the body 12 of casing 2 is generally cylindrical and has the nail 1 inserted along the axis thereof. A recess 20 is formed in the proximal end of the casing 2 to receive the nail head 21.

Figure 3:
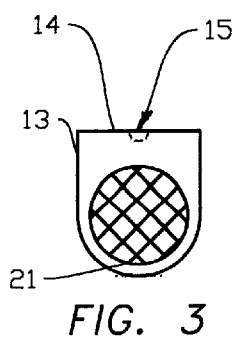
FIGS. 3 and 4 are end views showing the head end and tip end, respectively, of the surveying spike shown in FIG. 2.
Figure 4:
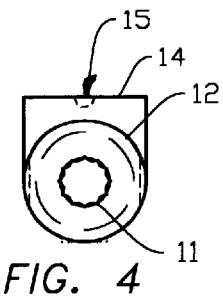

The casing 2 has a radially projecting portion 13 formed with a flat reference surface 14, as best shown in FIGS. 2 and 3. It should be noted that the flat surface 14 is at a greater radial distance than the outer surface of the body 12. The surface 14 is oriented horizontally when the spike is driven into the vertical surface.

A dimple 15 is formed in the surface 14, on the axis of casing 2. It is desirable that when the spike is fully driven into the vertical surface (so that only the casing 2 is then exposed), the dimple 15 is approximately 1.5 in. from the vertical surface. The dimple 15 has a size adequate to accept the end point of a prism pole. Since the dimple 15 is located on the projecting portion 13 of the casing 2, it provides a positive location for vertical control.

Alternatively, the nail 1 and casing 2 may be integrally formed of a metallic material. This arrangement may be more costly to manufacture than the combination of a metal nail and plastic casing.

The present invention enables a user to drive a permanent survey marker into a vertical surface, such as a tree or telephone pole, and have the dimple on a horizontal surface where it can be used with a prism pole. This permits the setting of permanent survey markers in easily visible locations that are unlikely to move for many years. The horizontal reference surface affords both horizontal and vertical (elevation) control.

The surveying spike of the present invention may be used to mark a property corner when it is not possible to drive a marker into the earth (for example, when a tree or a wall is located at the corner).

Figure 5:
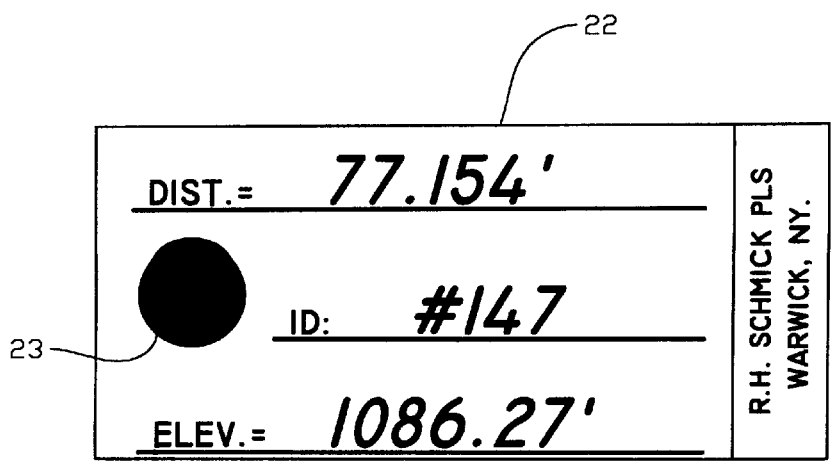
FIG. 5 shows an identification tag which is used in conjunction with the surveying spike in accordance with this invention.

The surveying spike of the present invention can also provide a benchmark that can be used to tie back into a previous survey or for elevation control during construction. A surveyor returning to the site can set up an EDM instrument at any desired location and tie back to the previous survey with three shots at the horizontal reference surface. To facilitate this procedure an identification tag 22, such as shown in FIG. 5, is provided for each surveying spike. Information such as distance and elevation is set forth on the tag for use in identifying the precise location of each spike. The tag may have a hole 23 punched therein to receive the nail shank 11 of the surveying spike, so that the tag will hang from the nail and be held in place (e.g., against a tree) by the plastic casing 2.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

What is claimed is:

1. A surveying spike comprising:
   a single nail portion having an axis; and
   an end portion having a longitudinal axis, said end portion being attached to said nail portion and being coaxial therewith, and said end portion having a body portion and a reference surface forming portion projecting radially from the body portion, the reference surface forming portion having a reference surface formed thereon parallel to the axis of said end portion, the reference surface having a dimple formed therein.

2. A surveying spike according to claim 1, wherein said nail portion is formed of a metallic material and said end portion is formed of a plastic material.

3. A surveying spike according to claim 2, wherein said nail portion has a head and a pointed end opposite thereto, and the head is in contact with said end portion.

4. A surveying spike according to claim 1, wherein said reference surface is orthogonal to a plane containing the axis of said nail portion and the dimple.

5. A surveying spike according to claim 1, wherein the body portion is generally cylindrical and a radial distance between the reference surface and the axis of said end portion is greater than a radius of the body portion.

6. A surveying spike according to claim 1, wherein at least a portion of a surface of said nail portion is striated.

7. A casing through which a nail is inserted to form a surveying spike, said casing having a longitudinal axis along which the nail is inserted, said casing comprising:
   a body portion; and
   a reference surface forming portion projecting radially from the body portion,
   wherein the reference surface forming portion has a reference surface formed thereon parallel to the longitudinal axis, and the reference surface has a dimple formed therein.

8. A casing according to claim 7, wherein said casing is formed of a plastic material.

9. A casing according to claim 7, wherein said reference surface is orthogonal to a plane containing the longitudinal axis and the dimple.

10. A casing according to claim 7, wherein said body portion is generally cylindrical and a radial distance between the reference surface and the longitudinal axis is greater than a radius of said body portion.

11. A method of manufacturing a surveying spike, comprising the steps of:
    providing one metal nail;
    providing a plastic member having a longitudinal axis and having a body portion and a reference surface forming portion projecting radially from the body portion with respect to the axis, the reference surface forming portion having a reference surface formed thereon parallel to the axis, the reference surface having a dimple formed therein; and
    inserting said nail into said plastic member along the longitudinal axis.

12. A method according to claim 11, wherein at least a portion of a surface of said nail is striated.

13. A surveying marker assembly, comprising:
    a surveying spike, said surveying spike comprising:
      a nail portion having an axis, and
      an end portion having a longitudinal axis, said end portion being attached to said nail portion and being coaxial therewith, and said end portion having a body portion and a reference surface forming portion projecting radially from the body portion, the reference surface forming portion having a reference surface formed thereon parallel to the axis of said end portion, the reference surface having a dimple formed therein; and
    an information tag adapted for being coupled to said surveying spike.

14. A surveying marker assembly according to claim 13, wherein a hole is formed in said information tag for receiving the nail of the surveying spike therein.

* * * * *